(12) United States Patent
LeBlanc et al.

(10) Patent No.: US 12,508,478 B1
(45) Date of Patent: Dec. 30, 2025

(54) COMPOSITE COMPONENTS OF A GOLF CLUB HEAD

(71) Applicant: Topgolf Callaway Brands Corp., Carlsbad, CA (US)

(72) Inventors: Dominic LeBlanc, Carlsbad, CA (US); Brandon DeMille, Carlsbad, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 194 days.

(21) Appl. No.: 18/368,774

(22) Filed: Sep. 15, 2023

Related U.S. Application Data

(60) Provisional application No. 63/408,570, filed on Sep. 21, 2022.

(51) Int. Cl.
*A63B 53/04* (2015.01)
*B32B 5/02* (2006.01)
*B32B 5/26* (2006.01)
*B32B 9/00* (2006.01)
*B32B 9/04* (2006.01)

(52) U.S. Cl.
CPC .............. *A63B 53/04* (2013.01); *B32B 5/024* (2013.01); *B32B 5/26* (2013.01); *B32B 9/007* (2013.01); *B32B 9/047* (2013.01); *A63B 2209/02* (2013.01); *B32B 2260/023* (2013.01); *B32B 2260/046* (2013.01); *B32B 2307/518* (2013.01); *B32B 2307/52* (2013.01); *B32B 2307/718* (2013.01)

(58) Field of Classification Search
CPC .......... A63B 53/04; B32B 5/26; B32B 9/007; B32B 9/047
See application file for complete search history.

(56) References Cited

U.S. PATENT DOCUMENTS

| | | | |
|---|---|---|---|
| 6,273,830 B1 * | 8/2001 | Takemura | B32B 5/28 473/319 |
| 2016/0051868 A1 * | 2/2016 | Deshmukh | A63B 53/0466 473/345 |
| 2019/0275390 A1 * | 9/2019 | Martens | A63B 60/02 |
| 2021/0008840 A1 * | 1/2021 | Gurijala | B32B 5/20 |

* cited by examiner

*Primary Examiner* — Raeann Gorden
(74) *Attorney, Agent, or Firm* — Michael A. Catania

(57) ABSTRACT

A composite material for a component of a golf club head is disclosed herein. The composite material includes a composite layers and at least one an interlaminar layer that includes one of vertically aligned carbon nanotubes, Z-Axis aligned carbon fibers or graphene platelets. In one preferred embodiment, the golf club head component is a face component.

8 Claims, 19 Drawing Sheets

Cross Section of Unidirectional and Multiaxial Composite Layer Laminate

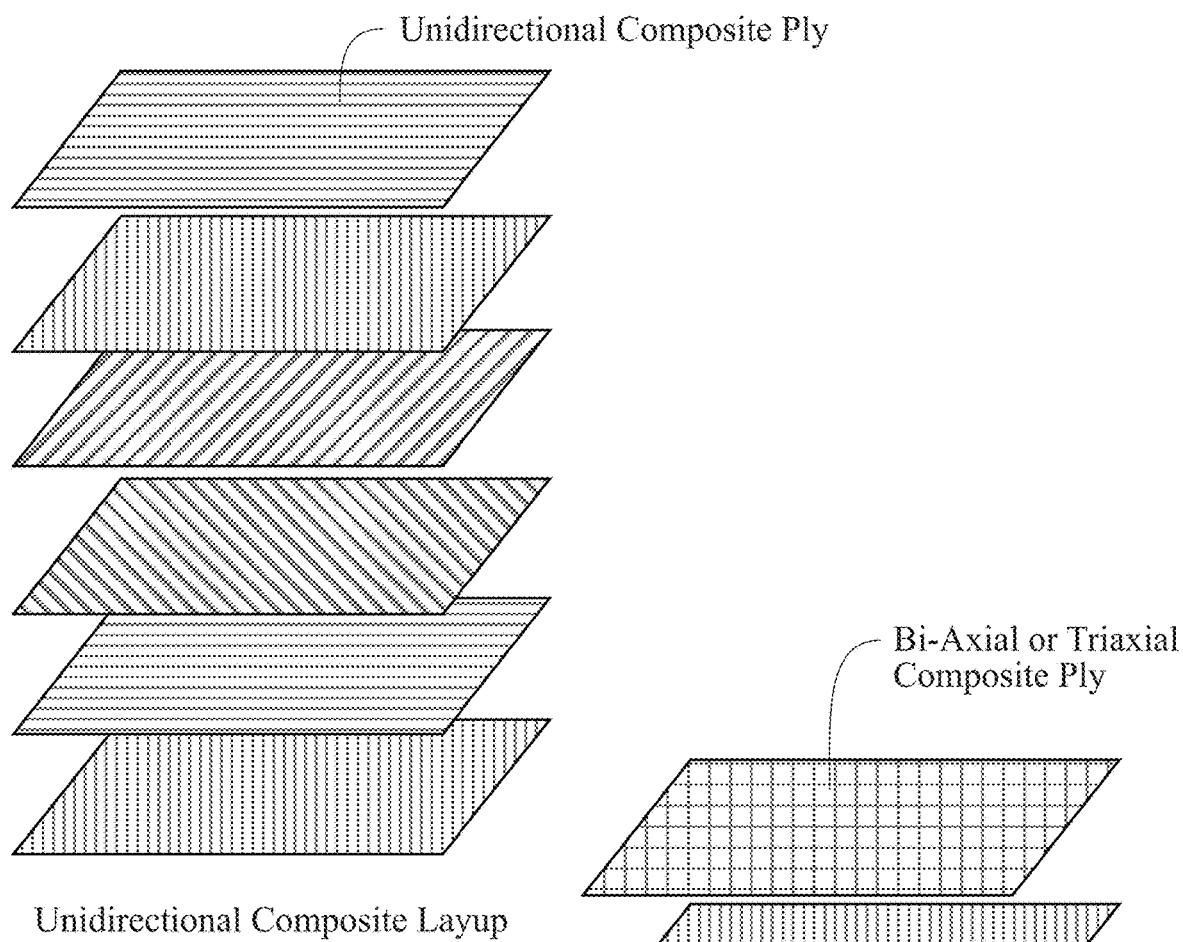
FIG. 2A — Unidirectional Composite Layup
FIG. 2B — Multi-axial and unidirectional Composite Layup Composite Plate or Laminate Cross Section of Unidirectional Composite Panel Cross Section of Unidirectional and Multiaxial Composite Layer Laminate

COMPOSITE COMPONENTS OF A GOLF CLUB HEAD

CROSS REFERENCES TO RELATED APPLICATIONS

The Present Application claims priority to U.S. Provisional Patent Application No. 63/408,570, filed on Sep. 21, 2022, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to improvements for interlaminar shear strength and impact tolerance for composite components in a golf club head.

Description of the Related Art

The center of gravity (CG) of a golf head is crucial to its performance. The CG of a golf head affects the spin and launch profile of the ball as it leaves the golf head. Because of this golf club manufacturers often combine metallic golf club head bodies with composite components to lower the club's center of gravity and thus improving the overall mass properties of the head. To that same extent, lightweight composite materials can also be used in the sole of a driver design in order to increase the overall moment of inertia as well as target a specific CG depth or bias. For example, a sole plate located in the toe area of a driver design would move the center of gravity heel-ward thus promoting draw bias.

These low density composite components are designed to be as light as possible while satisfying various design requirements. These design requirements include: overall durability of the composite components subject to a golf ball impacting the golf head; and overall durability of the composite components subject to golfer abuse. For example, impacting the sole of the golf head with the ground of turf.

Carbon fiber reinforced polymer (CFRP) composites are widely used for structural designs and solutions where high specific strength and stiffness are necessary. In general, these structures are comprised of a multitude of composite plies, each tailored in size and orientation in order to satisfy specific design requirements (FIG. 2). When considering CFRP composites, the strength and stiffness is almost entirely provided by the reinforced fiber whereas the resin or matrix serves to bind the fibers together and to inherently transfer the load to the fibers as well as protect them from the environment.

Because of the great difference in stiffness and strength between fiber reinforcements and the matrix or resin, certain failure mechanisms in composite structures are widely due to the limits of the resin system. With this said, a critical limitation of composite laminates lies between the region between laminated plies, or generally speaking in the z-direction (FIG. 3). Due to the lack of reinforcement across this resin rich interface, it can serve as a preferential pathway for both crack initiation and crack propagation. In this case, delamination is a common type of damage in composite laminates.

BRIEF SUMMARY OF THE INVENTION

This invention discloses the use of specific material configurations in order to increase the interlaminar shear and/or tensile strength in laminated composites (face inserts or other club head components).

The purpose of this invention is to provide techniques and specific material configurations that enable the improvements in mechanical properties of laminated composites in a face insert or other club head component. As outlined earlier, because of their weak properties in their through-thickness direction, interlaminar cracks or delamination is one of the main types of failure encountered in laminated composite components. Throughout repeated use of the golf club impacting golf balls, this type of failure may propagate to the point of the face insert or other golf head component to fail deeming the golf head unusable.

This invention pertains to the use of various material configurations at the interlaminar level of the composite laminate. By introducing higher strength materials between the composite plies, this can lead to overall improvements in interlaminar fracture toughness and also improvements in fatigue life.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 2A is an illustration of a unidirectional composite layup.

FIG. 2B is an illustration of multi-axial and unidirectional composite layup.

DETAILED DESCRIPTION OF THE INVENTION

As it pertains to this invention, the following material configurations are effective in improving mechanical properties and fatigue life: vertically aligned carbon nanotubes (VACNTs); z-axis aligned carbon fibers between plies; low-modulus, high strain-to-failure material layers between plies where delamination is likely to occur; z-stitching of plies together; and graphene platelets with one plane of the plate being aligned in z-axis between plies.

Figure 8:
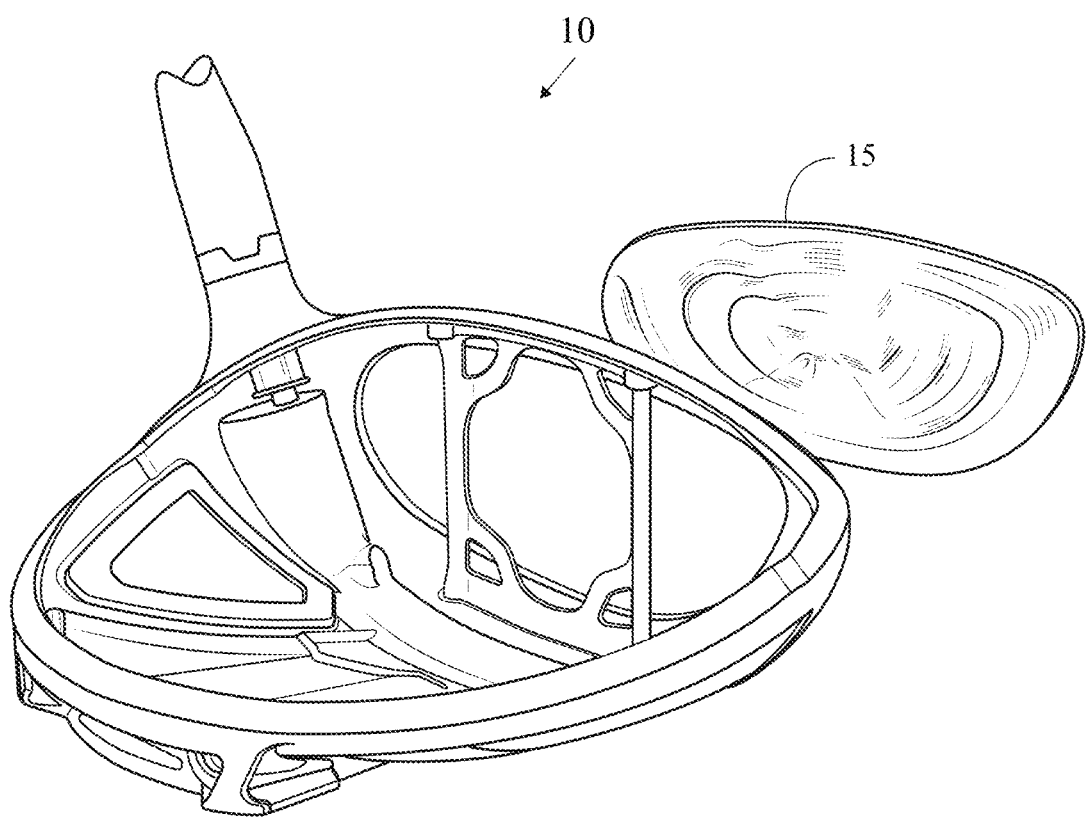
FIG. 8 is a top perspective view of a golf club head shown with its crown insert and face removed.
Figure 9A:
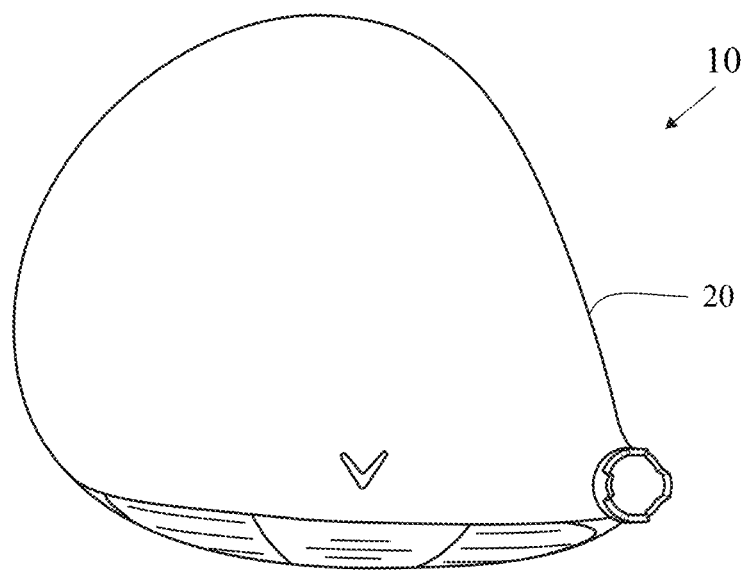
FIG. 9A is a top elevational view of a golf club head
Figure 9B:
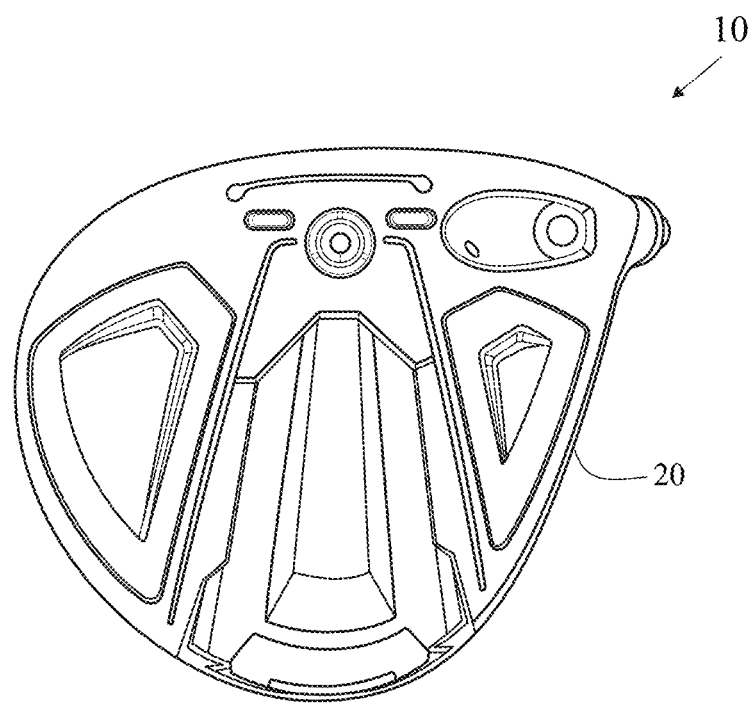
FIG. 9B is a sole elevational view of the golf club head shown in FIG. 9A.
Figure 9C:
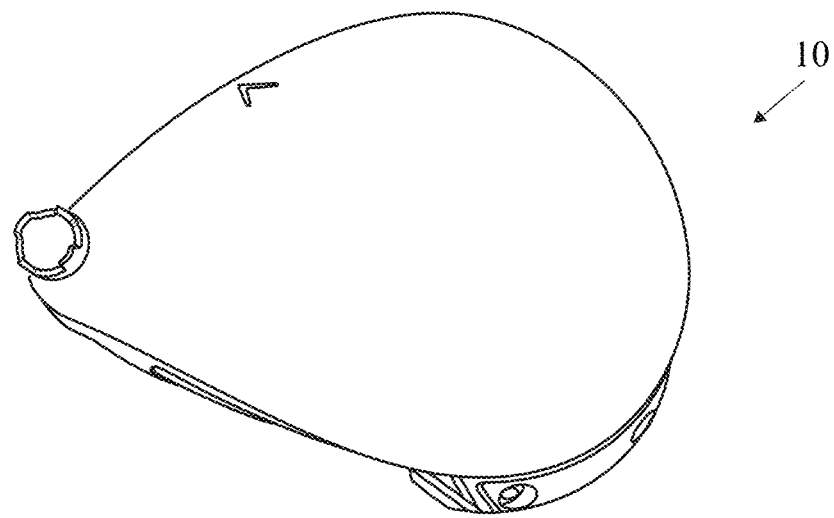
FIG. 9C is a top perspective view of the golf club head shown in FIG. 9A.
Figure 9D:
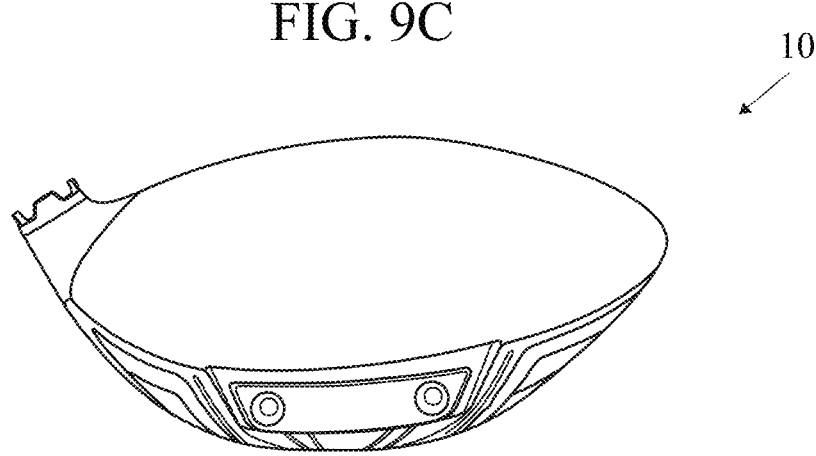
FIG. 9D is a back elevational view of the golf club head shown in FIG. 9A.
Figure 9E:
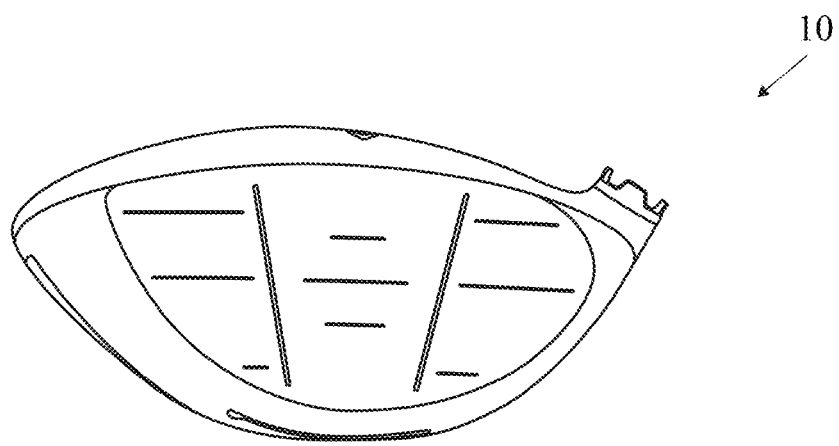
FIG. 9E is a face elevational view of the golf club head shown in FIG. 9A.
Figure 9F:
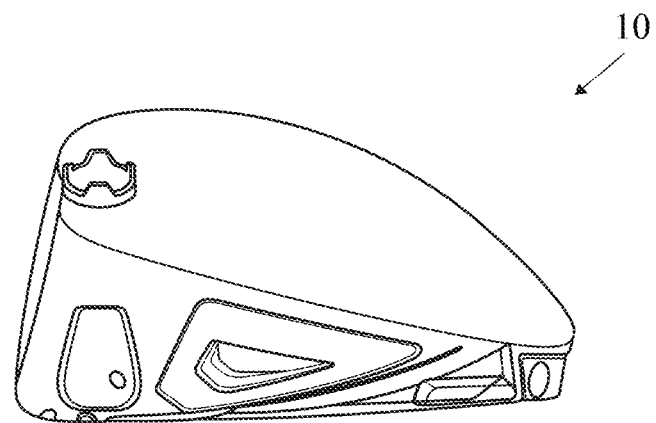
FIG. 9F is a heel elevational view of the golf club head shown in FIG. 9A.
Figure 9G:
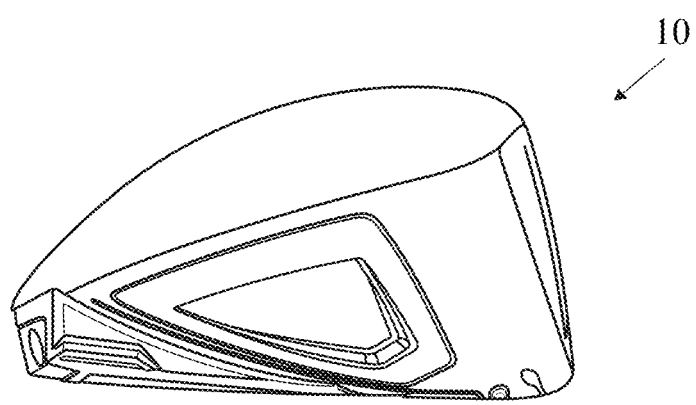
FIG. 9G is a toe elevational view of the golf club head shown in FIG. 9A.
Figure 10A:
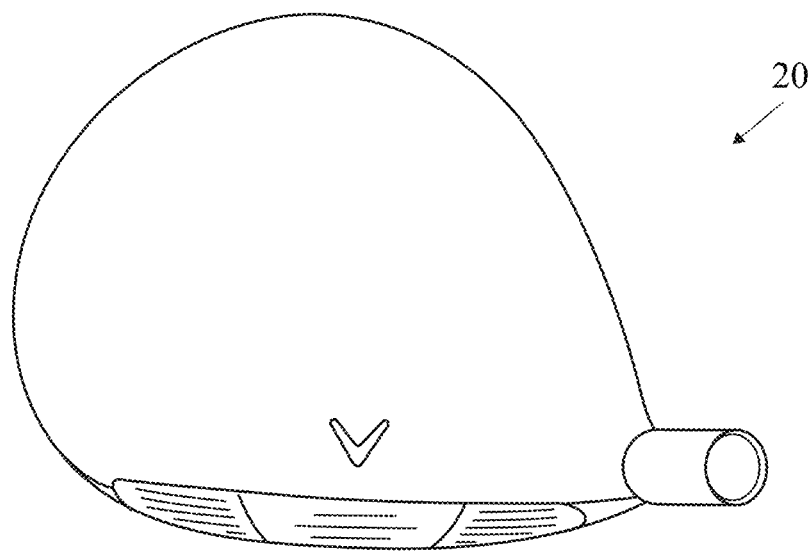
FIG. 10A is a top elevational view of a golf club head
Figure 10B:
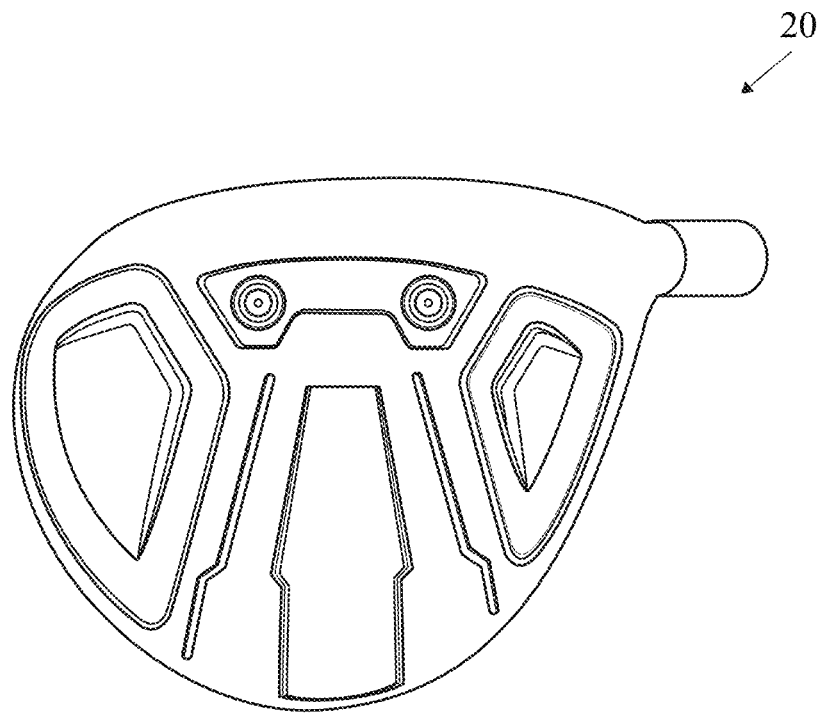
FIG. 10B is a sole elevational view of the golf club head shown in FIG. 10A.
Figure 10C:
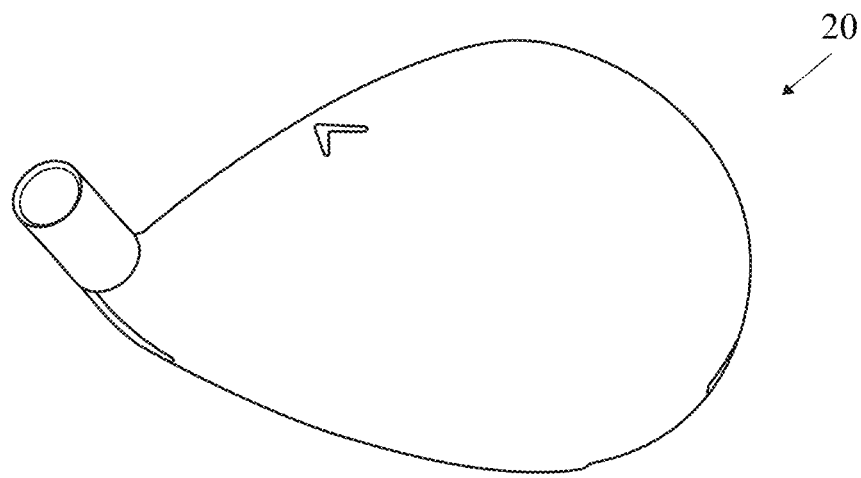
FIG. 10C is a top perspective view of the golf club head shown in FIG. 10A.
Figure 10D:
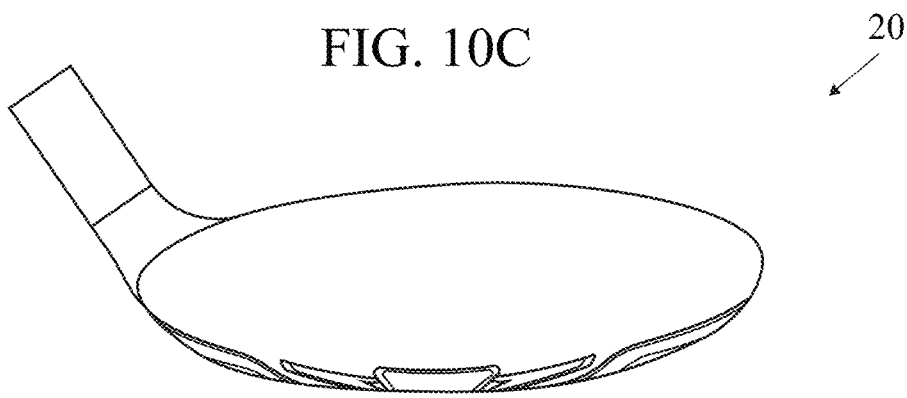
FIG. 10D is a back elevational view of the golf club head shown in FIG. 10A.
Figure 10E:
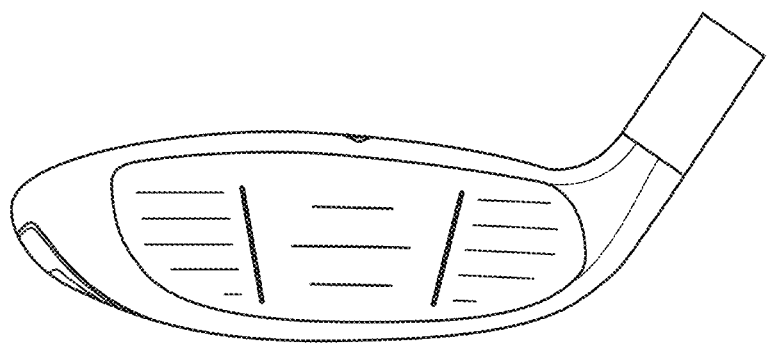
FIG. 10E is a face elevational view of the golf club head shown in FIG. 10A.
Figure 10F:
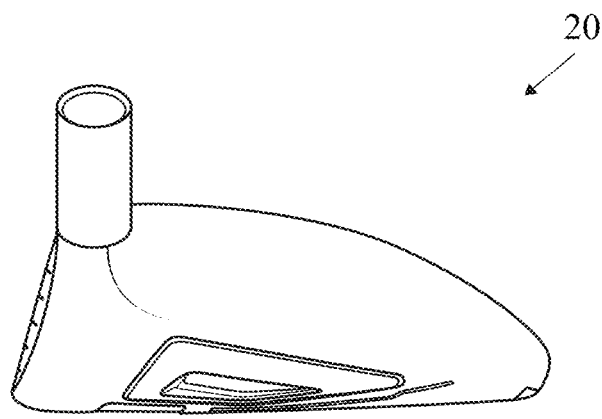
FIG. 10F is a heel elevational view of the golf club head shown in FIG. 10A.
Figure 10G:
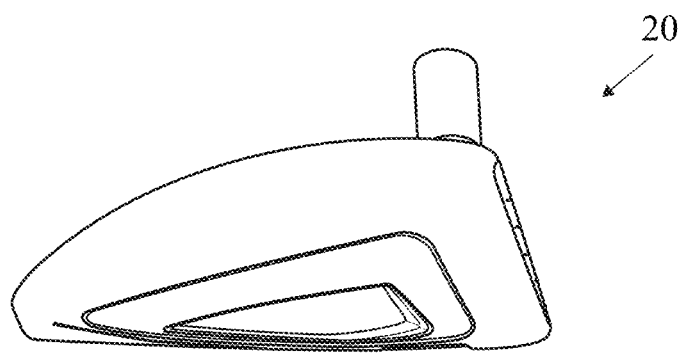
FIG. 10G is a toe elevational view of the golf club head shown in FIG. 10A.
Figure 11A:
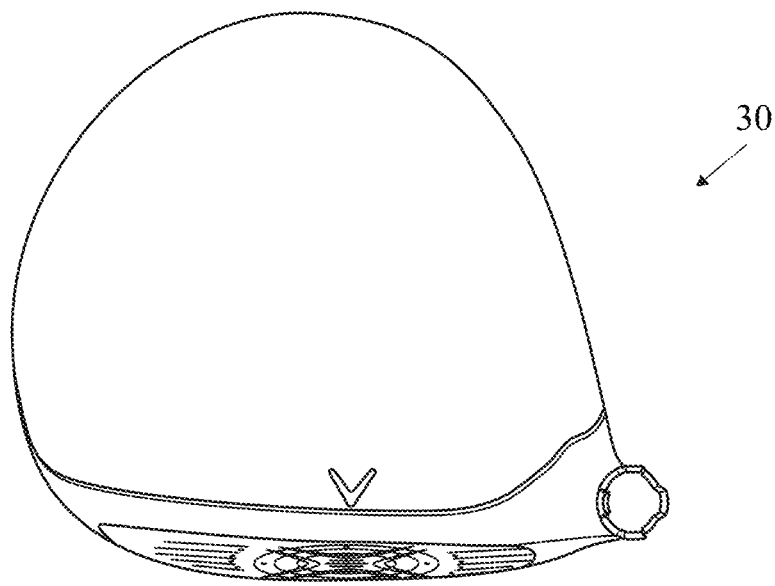
FIG. 11A is a top elevational view of a golf club head
Figure 11B:
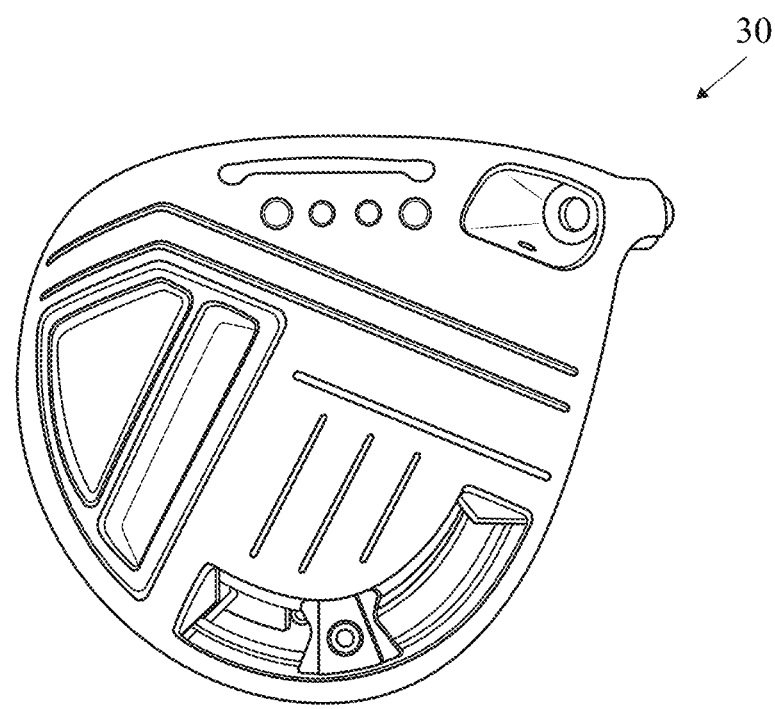
FIG. 11B is a sole elevational view of the golf club head shown in FIG. 11A.
Figure 11C:
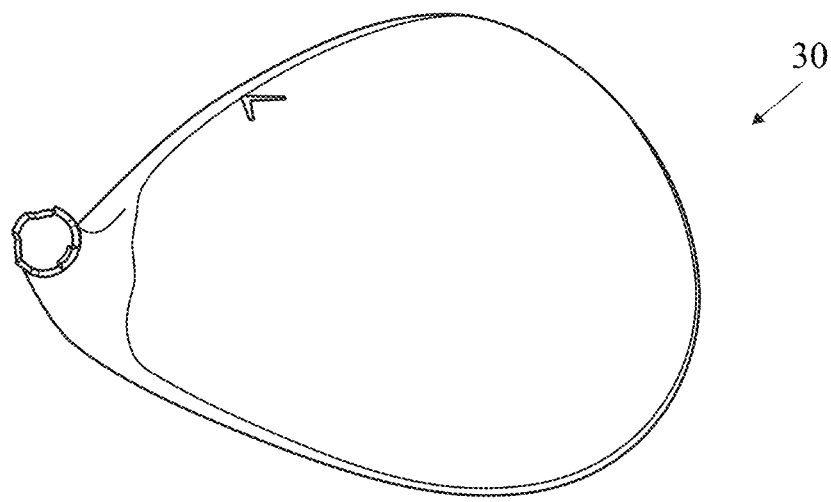
FIG. 11C is a top perspective view of the golf club head shown in FIG. 11A.
Figure 11D:
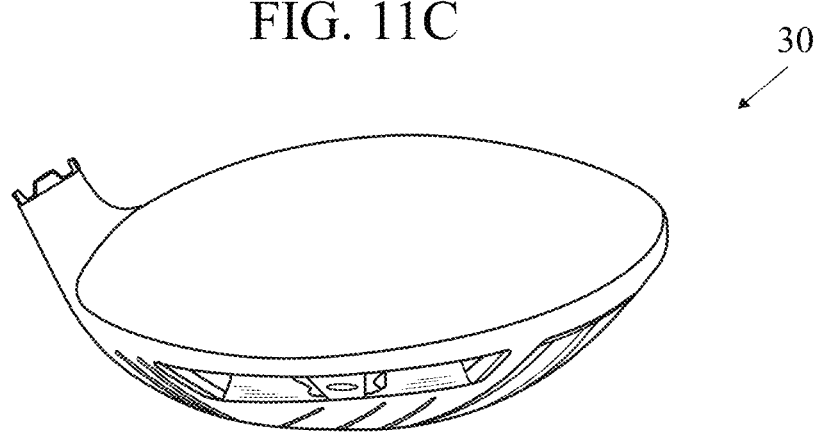
FIG. 11D is a back elevational view of the golf club head shown in FIG. 11A.
Figure 11E:
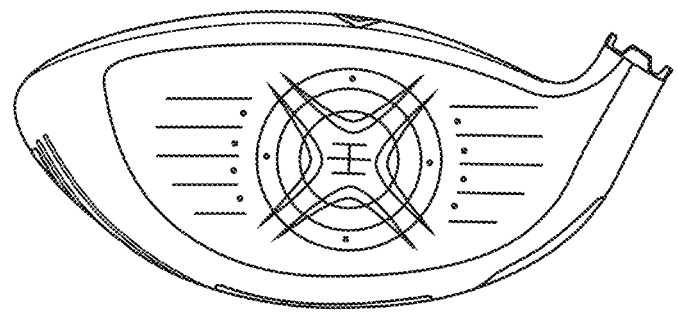
FIG. 11E is a face elevational view of the golf club head shown in FIG. 11A.
Figure 11F:
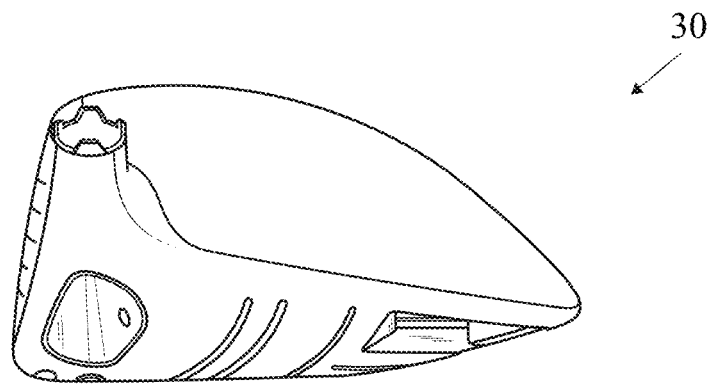
FIG. 11F is a heel elevational view of the golf club head shown in FIG. 11A.
Figure 11G:
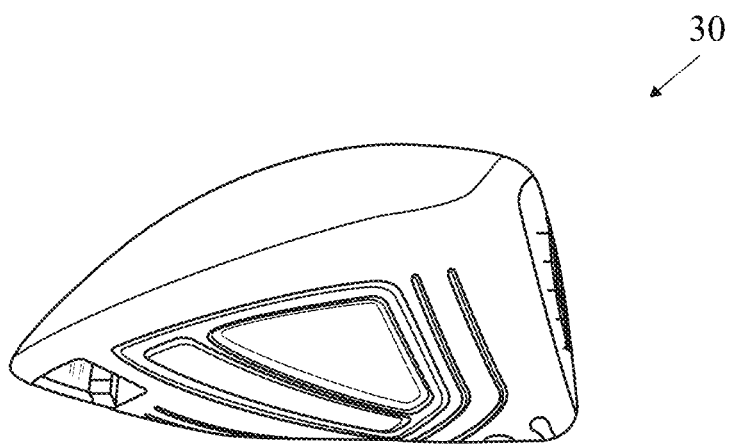
FIG. 11G is a toe elevational view of the golf club head shown in FIG. 11A.

This invention pertains to the addition of specific material configurations in a composite laminate for a face insert 15, such as in FIG. 8, or other club component in order to increase its mechanical properties as it pertains to interlaminar shear strength as well as fracture toughness. For the purpose of this invention let Area_$Ply_k$ be the area of an individual ply k in the composite laminate. Additionally, Area_$Additive_k$ is the area of the reinforcement present between offsetting plies (k and k+1). With this said, the number of additives present in a laminate used to improve mechanical properties can be defined by the Additive_Laminate_Ratio as outlined in equation 1.

EQUATION 1

$$\text{Additive Laminate Ratio} = \frac{\sum_{k=1}^{m-1} \text{Area}_{Additive_k}}{\sum_{k=1}^{m} \text{Area}_{Ply_k}} \quad (1)$$

Where m=total number of plies

Where Area_$Ply_k$ is the area of each composite ply (k) in the laminate

Where Area Additive (k) is the area of the reinforcement present between offsetting plies (k and k+1).

Composite Laminate–UD

Figure 1:
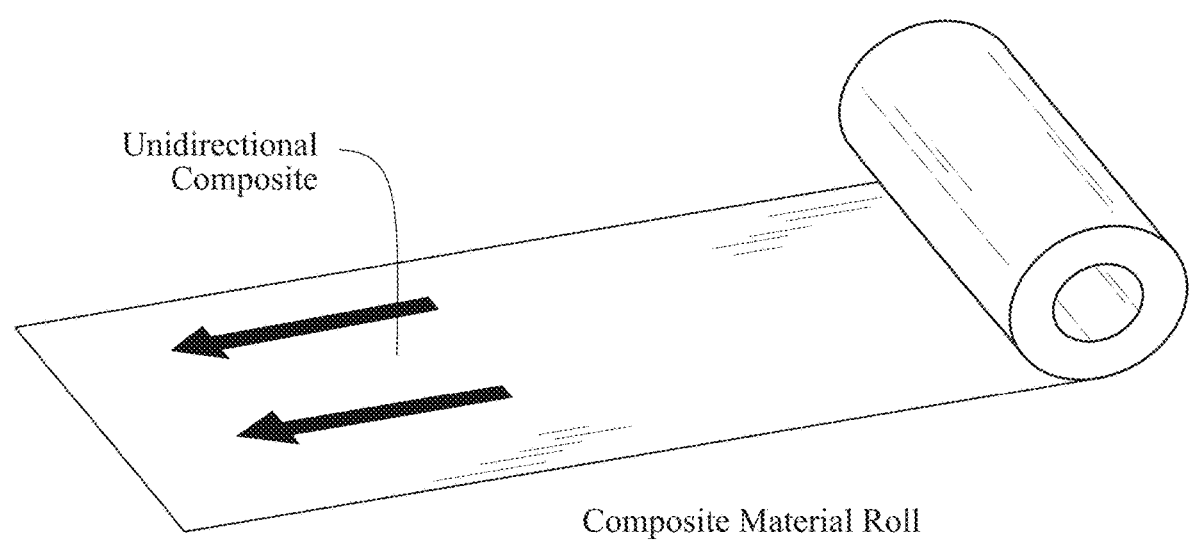
FIG. 1 is an illustration of a composite material roll.

Individual layers or plies in the composite laminate may be comprised of a unidirectional (UD) composite layer or a fabric consistent of a bi-axial of tri-axial woven composite, as shown in FIGS. 1, 2A and 2B. For the purpose of this invention, the fiber reinforcement in the composite material system may include carbon, fiberglass, aramid or any combination of the three.

Figure 2C:
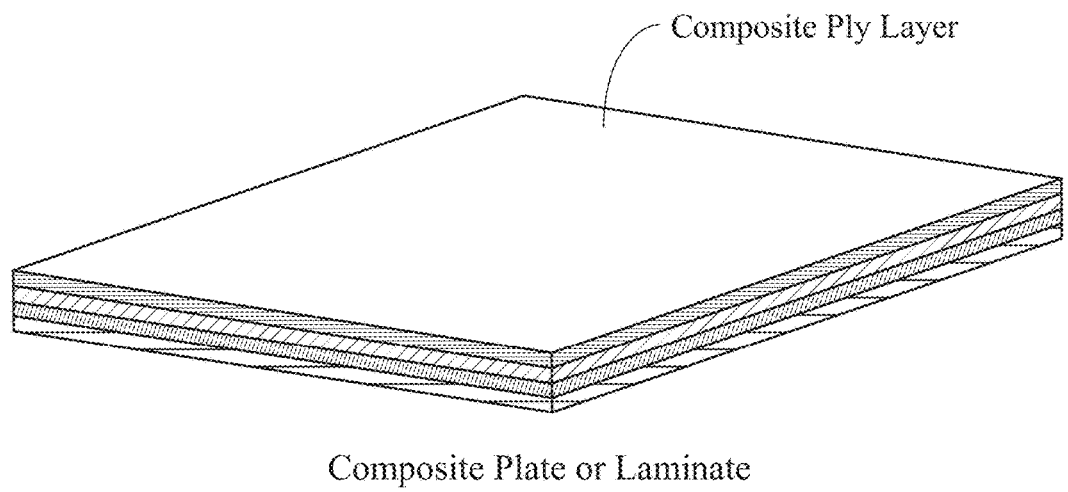
FIG. 2C is an illustration of a composite laminate.
Figure 2D:
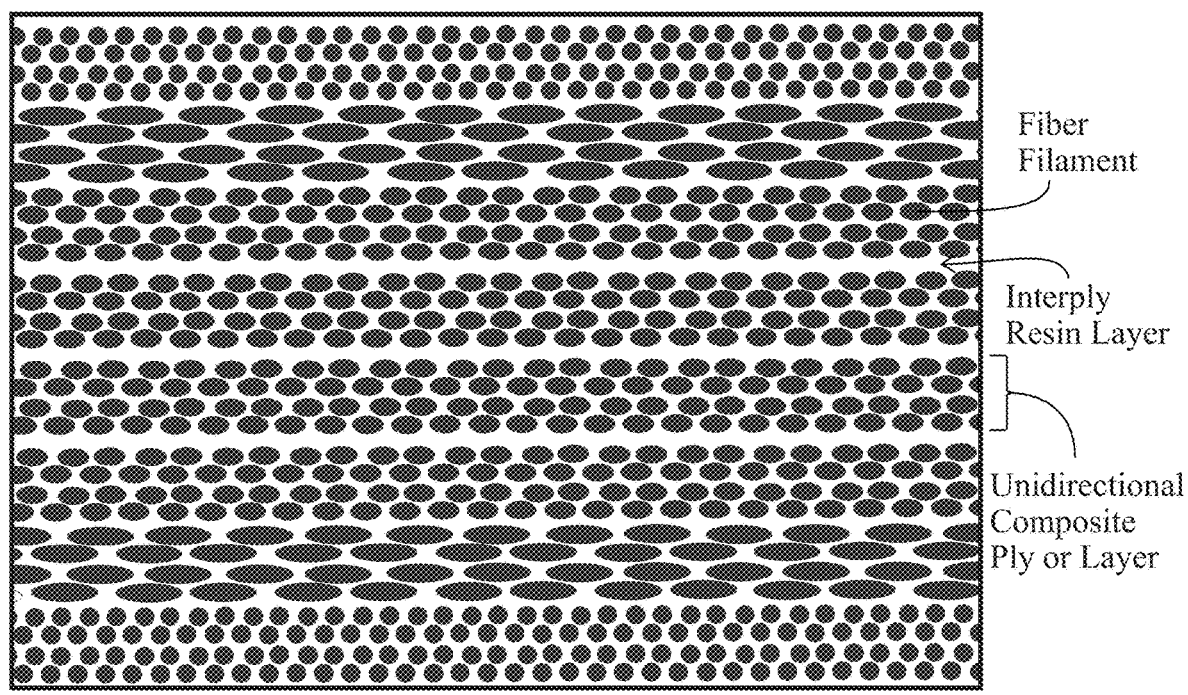
FIG. 2D is an illustration of a cross-section of a unidirectional composite panel.
Figure 2E:
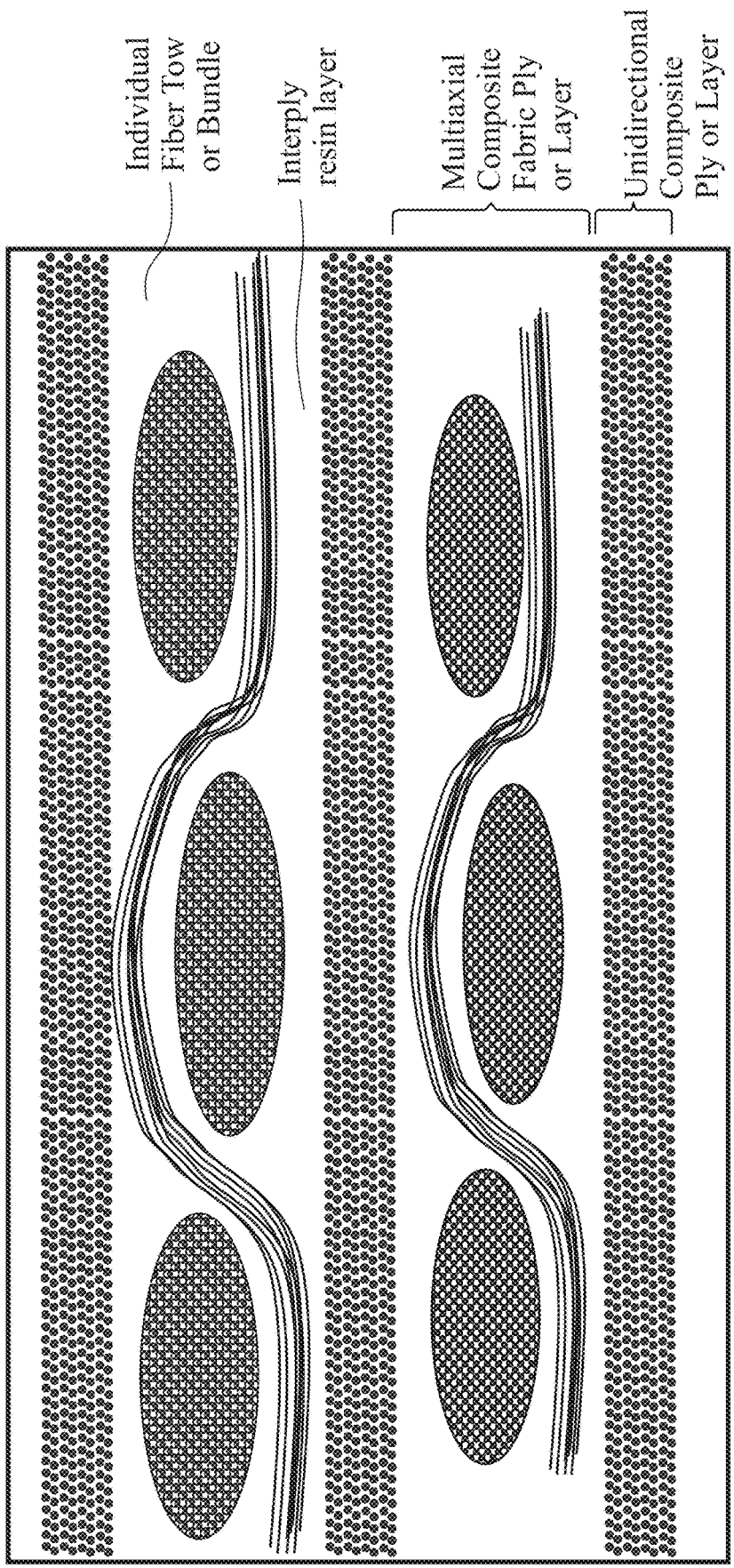
FIG. 2E is an illustration of a cross-section of a unidirectional and multi-axial composite layer laminate.

The number of layers or plies in a stack of a composite laminate of the present invention can vary between 2 and 200 plies. FIG. 2C illustrates a composite laminate with several layers. Each composite ply may be a composite of either UD, bi-axial or tri-axial woven composite. The fabric area weight (FAW) of each composite ply can range from 20 gsm up to 500 gsm. The fiber reinforcement in the composite material for each ply may include carbon, fiberglass, aramid or any combination of the three. The matrix material that is combined with the fiber bundles of each ply to create the composite material of the present invention can be of a thermosetting (epoxy, polyester, vinyl ester, etc.) or a thermoplastic (nylon, polycarbonate, PPS, PEKK, PEEK, etc.) material. FIGS. 2D and 2E illustrate cross-sections of a UD composite panel and a UD and multi-axial composite laminate, respectively, showing different layers.

Composite Laminate–SMC

Figure 5:
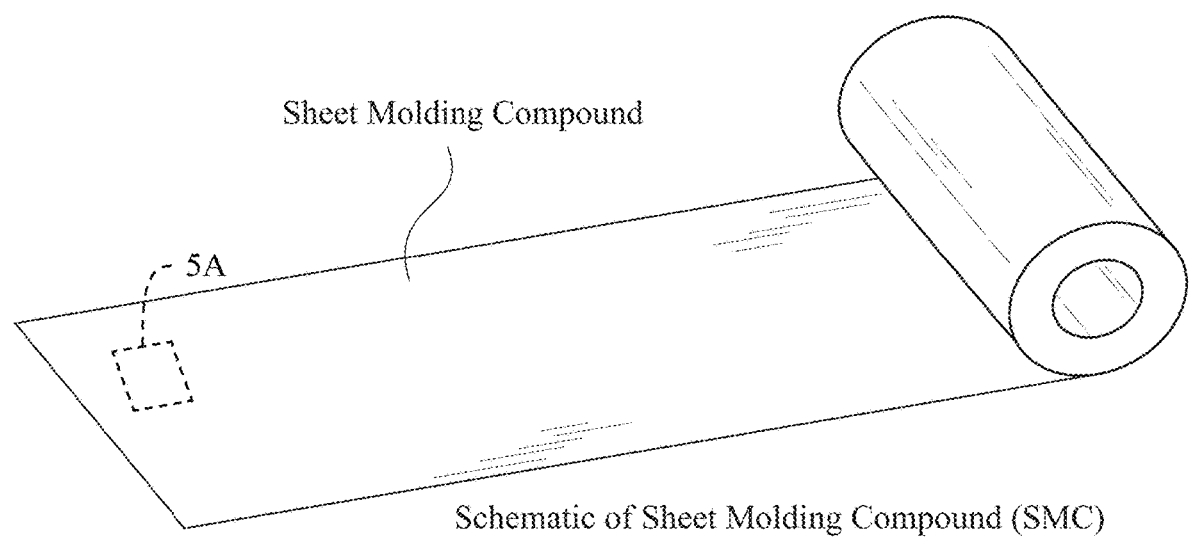
FIG. 5 is an illustration of a sheet molding compound.
Figure 5A:
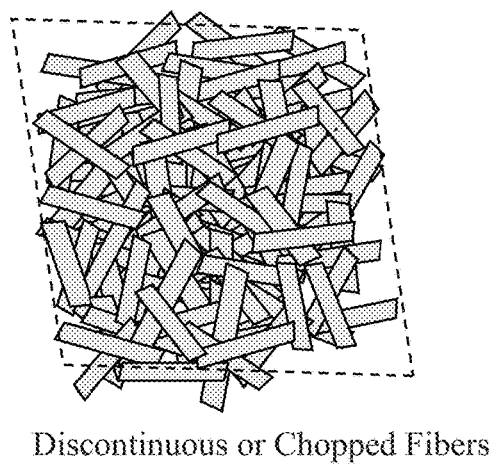
FIG. 5A is an illustration of chopped fibers of FIG. 5.

In some embodiments, the composite may be sheet molding compound (SMC), which may be comprised of chopped fibers, as shown in FIGS. 5 and 5A. Each chopped fiber has a length less than 0.0625 or a length that is no less than 2 inches and no more than 4 inches.

The SMC of the present invention has the following qualities: the fiber reinforcement of the SMC may include carbon, fiberglass, aramid or any combination of the three; the matrix material that is combined with the fiber bundles of each ply to create the composite material of the present invention can be a thermosetting (epoxy, polyester, vinyl ester, etc.) or a thermoplastic (nylon, polycarbonate, PPS, PEKK, PEEK, etc.) material; and the thickness of the SMC may vary between 0.015" to 0.250".

Composite Laminate+SMC.

As it pertains to this invention, the use of continuous and discontinuous materials may be used within the same composite component. Following equation 2, the Contiuous Fiber_Ratio quantifies the amount of continuous fiber there is in the laminate compared to the discontinuous fiber or SMC.

EQUATION 2

$$\text{Contiuous Fiber\_Ratio} = \frac{\text{Continuous Fiber}_{Thickness}}{SMC_{Thickness} + \text{Continuous Fiber}_{Thickness}} \quad (2)$$

Where Continuous Fiber_Thickness refers to the thickness occupied by continuous fiber at any point in the composite part. Where SMC_Thickness is the thickness occupied by the sheet molding compound material at any point in the composite part.

Laminates comprised of continuous and discontinuous (SMC) materials of the present invention have a Contiuous Fiber_Ratio that may vary between 0.9 and 0.1. The SMC material is positioned in the middle of the laminated acting as a core. The SMC material is located at the outer most portion of the laminate. The SMC material is located in several portions of the laminate, sandwiched between multiple continuous plies.

VACNTs

Figure 4:
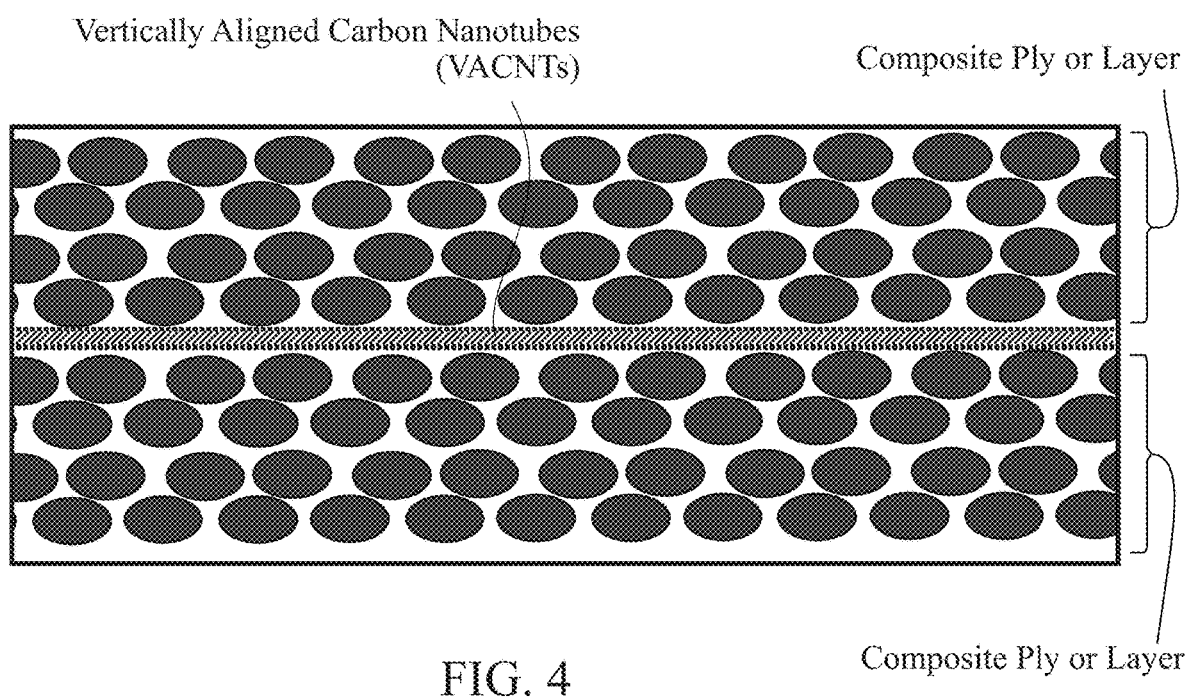
FIG. 4 is an illustration of a cross-section of a composite panel.

VACNTs can be placed at the interface of composite plies in order to improve interlaminar shear strength while also improving overall fatigue life. A schematic of the VACNTs is illustrated in FIG. 4. VACNTs bridge the various composite plies, improving the interlaminar properties of the interfaces as well as arresting crack propagation or pre-failure modes at the interlaminar level. As it relates to this invention, the length of the VACNTs may vary between 5 and 50 µm. VACNTs of the present invention have the following qualities: the VACNTs height can vary between 5 and 50 µm; the VACNTs are applied on a single side of a composite ply; the VACNTs are applied on both sides of a composite ply; and the Additive_Laminate_Ratio can vary between 0.05 and 0.90.

Figure 6A:
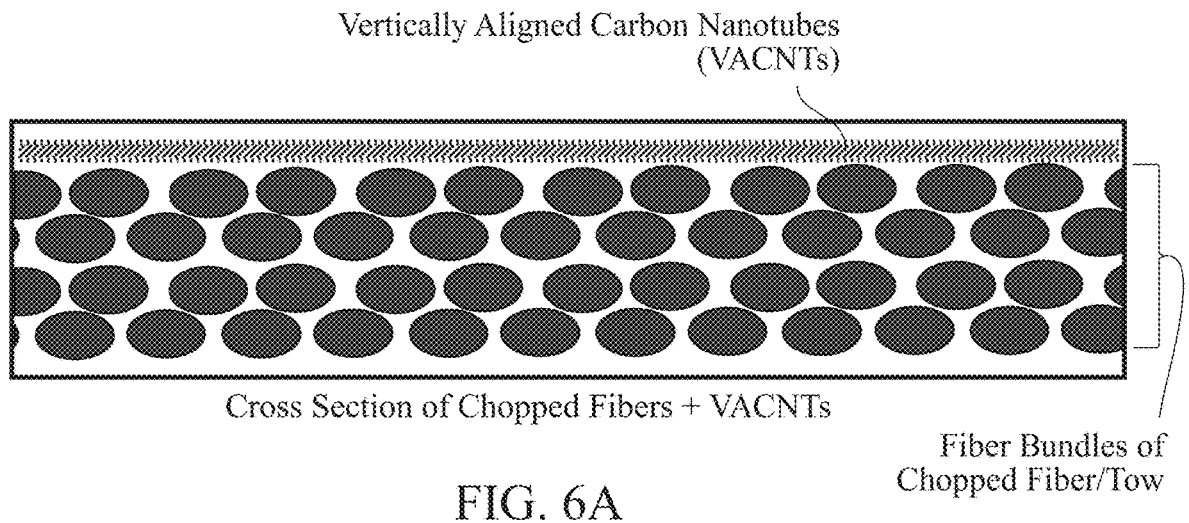
FIG. 6A is an illustration of a cross-section of chopped fibers and vertically aligned carbon nanotubes.
Figure 6B:
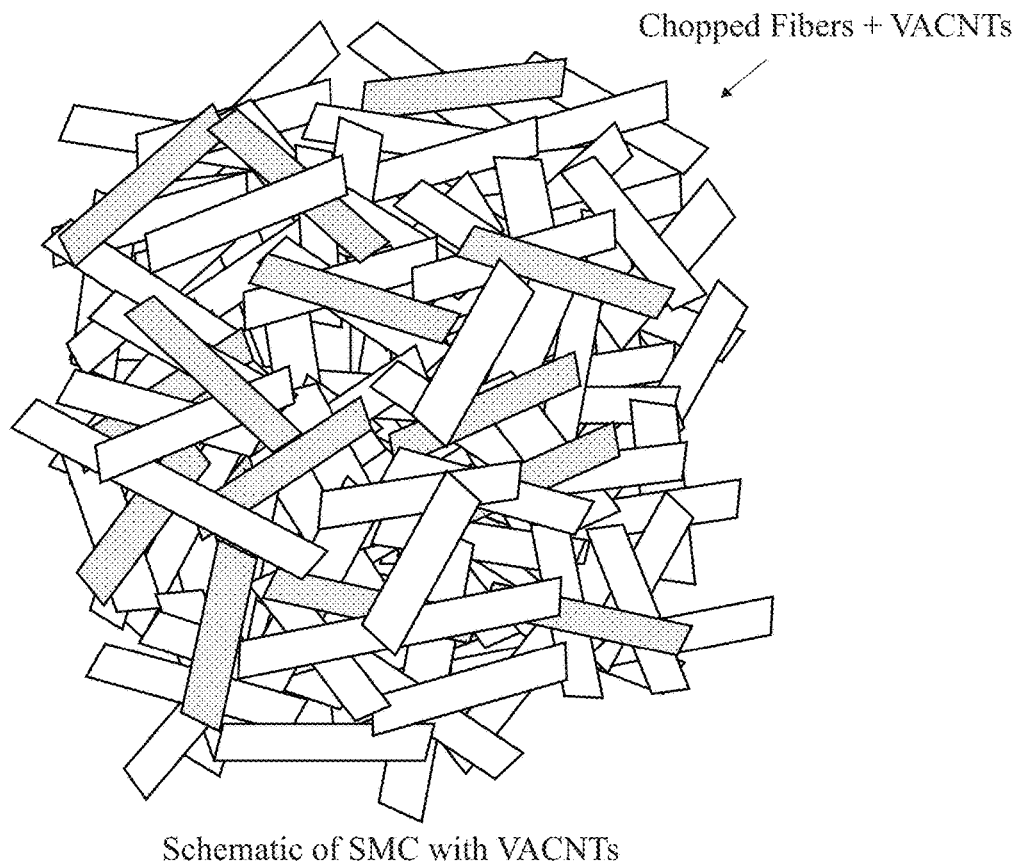
FIG. 6B is an illustration of a sheet molding compound with vertically aligned carbon nanotubes.
Figure 7:
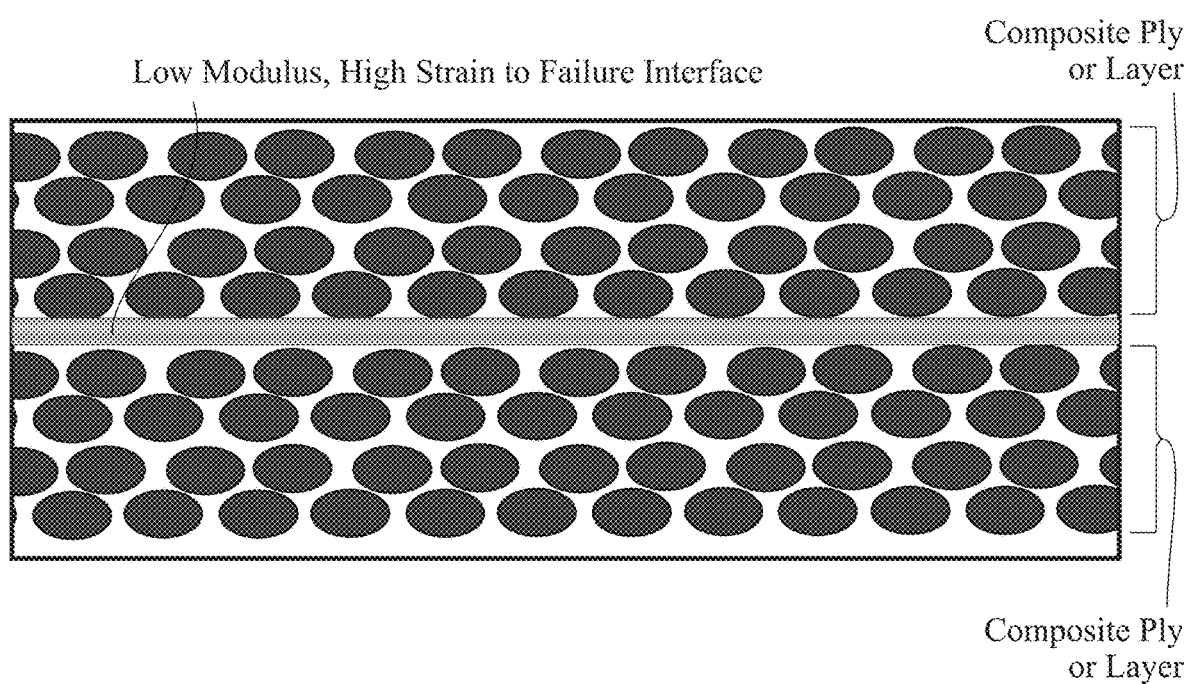
FIG. 7 is an illustration of a cross-section of a composite panel.

For the same reasons that VACNTs are effective at the interlaminar interface of continuous fiber composites they can also be utilized in sheet molding compound applications. In this case, the VACNTs are applied on the individual fiber strands, illustrated in FIGS. 6A-6B. As it pertains to this invention, regarding VACNTs at the interface of SMC, the following claims can be made: the VACNTs height can vary between 5 and 50 µm; the VACNTs are applied on a single side individual chopped fiber strands; the VACNTs are applied on both single sides of individual chopped fiber strands; and the Additive_Laminate_Ratio (equation 1) can vary between 0.05 and 0.90.

Z-Axis Aligned Carbon Fibers

Similarly to VACNTs, z-axis aligned carbon fibers can be placed in between composite plies in a laminate in order to improve overall interlaminar shear strength as well as overall fatigue to various loading conditions. As it pertains to this invention regarding z-axis aligned carbon fibers. The average thickness of the z-axis aligned carbon between composite plies may vary between 0.003" and 0.060". The fiber areal weight (FAW) of each z-axis aligned carbon fiber layer may vary between 10 gsm and 300 gsm. The Additive_Laminate_Ratio (equation 1) can vary between 0.05 and 0.90.

Low Modulus, High Strain to Failure Interface

Figure 3:
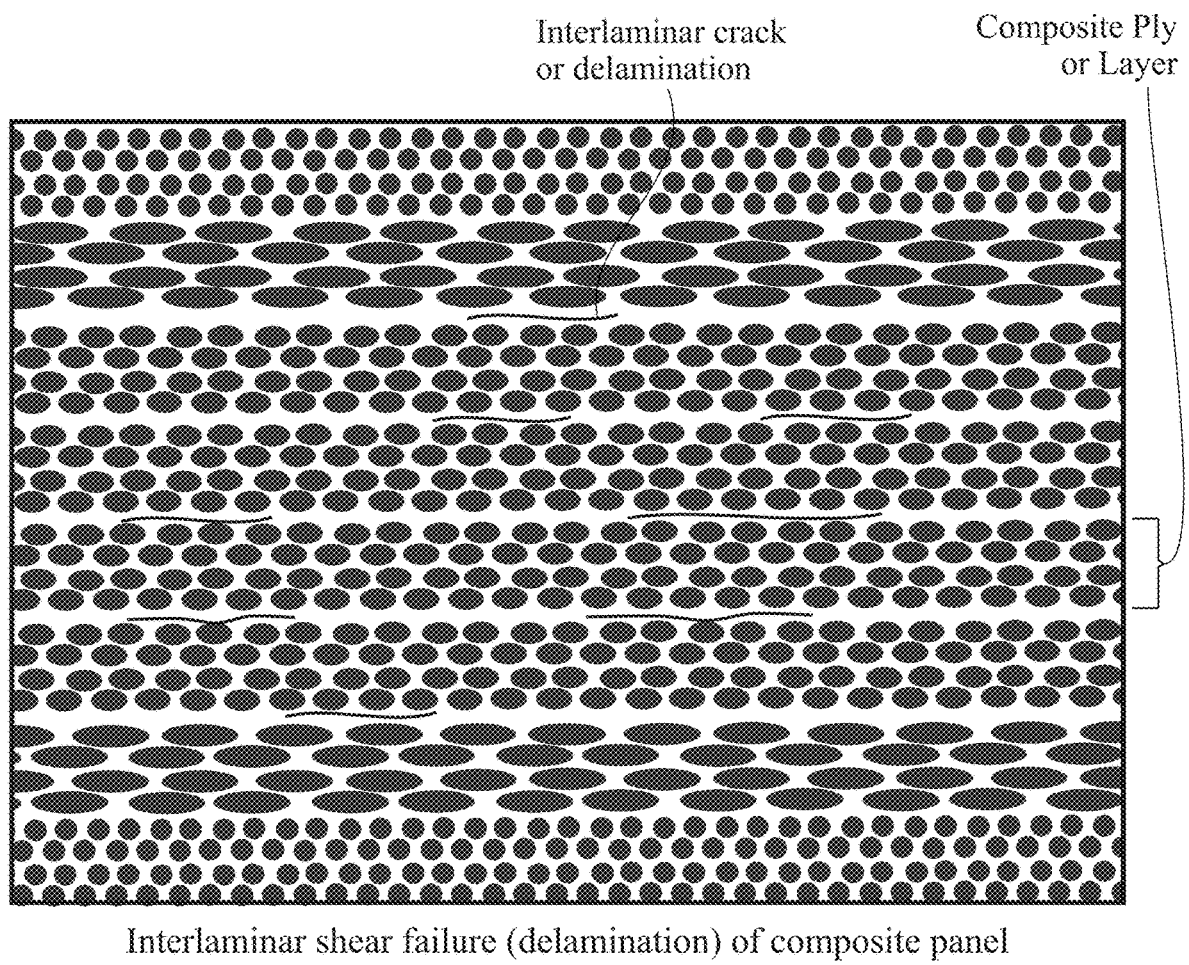
FIG. 3 is an illustration of interlaminar shear failure of a composite panel.

As outlined earlier, because of their weak properties in their through-thickness direction as a well as low strain to failure of the matrix system, interlaminar cracks or delamination is one of the main types of failure encountered in laminated composite components, as shown in FIG. 3. Having a tougher interface between composite plies would inherently improve interlaminar fracture toughness and also improve fatigue life. With this said, a low-modulus, high strain-to-failure material placed between composite plies or layers where delamination is likely to occur. As it pertains to this invention regarding a low modulus interface the following claims can be made. The thickness of the interface may vary between 0.001" and 0.020". The modulus of the interface material may vary between 0.01 Msi and 0.5 Msi. The strain to failure or elongation at break may vary between 10% and 150%. The Additive_Laminate_Ratio (equation 1) may vary between 0.05 and 0.90.

Carbon fiber reinforced polymer (CFRP) composites are widely used for structural designs and solutions where high specific strength and stiffness are necessary. In general, these structures are comprised of a multitude of composite plies, each tailored in size and orientation in order to satisfy specific design requirements (FIG. 2). When considering CFRP composites, the strength and stiffness is almost entirely provided by the reinforced fiber whereas the resin or matrix serves to bind the fibers together and to inherently transfer the load to the fibers as well as protect them from the environment.

The use of specific materials or additives in between composite plies allows for overall improvements in interlaminar fracture toughness and also improvements in fatigue life. The methods outlined in the present invention are vertically aligned carbon nanotubes (VACNTs), z-axis aligned carbon fibers between plies, and low-modulus, high strain-to-failure material layers between plies where delamination is likely to occur.

When the golf club head 10, 20 and 30 is designed as a driver, as shown in FIGS. 8-11G, it preferably has a volume from 200 cubic centimeters to 600 cubic centimeters, more preferably from 300 cubic centimeters to 500 cubic centimeters, and most preferably from 420 cubic centimeters to 470 cubic centimeters, with a most preferred volume of 460 cubic centimeters. In the preferred embodiment, the golf club head 10 has a volume of approximately 450 cc to 460 cc. The volume of the golf club head 10 will also vary between fairway woods (preferably ranging from 3-woods to eleven woods) with smaller volumes than drivers. When designed as a driver, the golf club head 10 preferably has a mass of no more than 215 grams, and most preferably a mass of 180 to 215 grams; when designed as a fairway wood, the golf club head 10 preferably has a mass of 135 grams to 200 grams, and preferably from 140 grams to 165 grams.

In each of the embodiments disclosed herein, the body 20 is preferably cast from molten metal in a method such as the well-known lost-wax casting method. The metal for casting is preferably titanium or a titanium alloy such as 6-4 titanium alloy, alpha-beta titanium alloy or beta titanium alloy for forging, and 6-4 titanium for casting. Alternatively, the body 20 is composed of 17-4 steel alloy. Additional methods for manufacturing the body 20 include forming the body from a flat sheet of metal, super-plastic forming the body from a flat sheet of metal, machining the body from a solid block of metal, electrochemical milling the body 20 from a forged pre-form, casting the body using centrifugal casting, casting the body 20 using levitation casting, and like manufacturing methods.

In other embodiments, the golf club head 10 may have a multi-material composition such as any of those disclosed in U.S. Pat. Nos. 6,244,976, 6,332,847, 6,386,990, 6,406,378, 6,440,008, 6,471,604, 6,491,592, 6,527,650, 6,565,452, 6,575,845, 6,478,692, 6,582,323, 6,508,978, 6,592,466, 6,602,149, 6,607,452, 6,612,398, 6,663,504, 6,669,578, 6,739,982, 6,758,763, 6,860,824, 6,994,637, 7,025,692, 7,070,517, 7,112,148, 7,118,493, 7,121,957, 7,125,344, 7,128,661, 7,163,470, 7,226,366, 7,252,600, 7,258,631, 7,314,418, 7,320,646, 7,387,577, 7,396,296, 7,402,112, 7,407,448, 7,413,520, 7,431,667, 7,438,647, 7,455,598, 7,476,161, 7,491,134, 7,497,787, 7,549,935, 7,578,751, 7,717,807, 7,749,096, and 7,749,097, the disclosure of each of which is hereby incorporated in its entirety herein.

Seluga et al., U.S. Pat. No. 9,757,629 for a Golf Club Head Having Stress Reducing Features is hereby incorporated by reference in its entirety.

Seluga et al., U.S. Pat. No. 9,776,058 for a Golf Club Head Having Optimized Ball Speed To CT Relationship is hereby incorporated by reference in its entirety.

Seluga et al., U.S. Pat. No. 11,433,281 for a Method For Manufacturing Golf Club Head Having Stress Reducing Features is hereby incorporated by reference in its entirety.

Gibbs et al., U.S. Pat. No. 11,433,282 for a Method For Manufacturing Golf Club Head Having Stress Reducing Features is hereby incorporated by reference in its entirety.

Davis et al., U.S. Pat. No. 11,400,349 for Golf Club Head With Heel And Toe Stiffeners is hereby incorporated by reference in its entirety.

Nunez et al., U.S. Pat. No. 11,364,423 for a Golf Club Head Having Stress Reducing Features is hereby incorporated by reference in its entirety.

DeMille et al., U.S. Pat. No. 11,331,544 for Binder Jet Printed Golf Club Components With Lattice Structures is hereby incorporated by reference in its entirety.

Westrum et al., U.S. Pat. No. 11,090,534 for a Golf Club Head Comprising Microscopic Bubble Material is hereby incorporated by reference in its entirety.

Frederickson, U.S. Pat. No. 11,083,939 for a Golf Club Head With Adjustable Sole Weight is hereby incorporated by reference in its entirety.

Del Rosario et al., U.S. Pat. No. 11,027,176 for a Golf Club Head With Hosel Support Structurel is hereby incorporated by reference in its entirety.

Hanhart et al., U.S. Pat. No. 10,912,970 for a Golf Club Head Having Adjustable Stress Reducing Features is hereby incorporated by reference in its entirety.

Frederickson, U.S. Pat. No. 10,716,984 for a Golf Club Head With Adjustable Center Of Gravity is hereby incorporated by reference in its entirety.

DeMille et al., U.S. Pat. No. 10,105,579 for a Golf Club Head With A Compression-Molded, Thin-Walled Aft-Body is hereby incorporated by reference in its entirety.

Seluga, U.S. Pat. No. 10,099,096 for a Golf Club Head With Center Of Gravity Adjustability That Optimizes Products Of Inertia is hereby incorporated by reference in its entirety.

Seluga, U.S. Pat. No. 9,968,834 for a Golf Club Head With Adjustable Center Of Gravity is hereby incorporated by reference in its entirety.

DeMille et al., U.S. Pat. No. 9,283,447 for a Golf Club Head With Composite Face is hereby incorporated by reference in its entirety.

Griffin et al., U.S. Pat. No. 9,381,409 for a Multiple Material Iron is hereby incorporated by reference in its entirety.

DeMille et al., U.S. Pat. No. 9,387,373 for a Golf Club Head With Composite Weight Port is hereby incorporated by reference in its entirety.

Rice et al., U.S. Pat. No. 9,468,819 for a Golf Club Head is hereby incorporated by reference in its entirety.

DeMille et al., U.S. patent application Ser. No. 18/212,612, filed on Jun. 21, 2023, for a Golf Club Head is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A composite material for a component of a golf club head, the composite material comprising:
a first composite layer;
a second composite layer; and
an interlaminar layer composed of vertically aligned carbon nanotubes;
wherein the first composite layer and the second composite layer comprise a plurality of plies, each of the plurality of plies a unidirectional orientation, a bi-axial orientation or a tri-axial orientation;
wherein a laminate comprises a structure formed from the first composite layer, the second composite layer and the interlaminar layer;
wherein an $$\text{additive laminate ratio} = \frac{\sum_{k=1}^{m-1} \text{Area}_{Additive_k}}{\sum_{k=1}^{m} \text{Area}_{Ply_k}}$$

wherein m=a total number of plies,
wherein an Area_Ply$_k$ is the area of each composite ply (k) in the laminate,
wherein an Area Additive (k) is the area of the reinforcement present between offsetting plies (k and k+1),
wherein the additive laminate ratio of the composite material ranges between 0.05 and 0.9.

2. The composite material according to claim 1 wherein each of the first composite layer and the second composite layer has a fabric area weight ranging from 20 gsm to 500 gsm.

3. The composite material according to claim 1 wherein each the first composite layer and the second composite layer comprises at least one of a carbon fiber, fiberglass fiber, or aramid fiber.

4. A composite material for a component of a golf club head, the composite material comprising:
a first composite layer;
a second composite layer; and
an interlaminar layer comprising one of vertically aligned carbon nanotubes, Z-Axis aligned carbon fibers or graphene platelets;
wherein the first composite layer and the second composite layer comprise a plurality of plies, each of the plurality of plies a unidirectional orientation, a bi-axial orientation or a tri-axial orientation;
wherein a laminate comprises a structure formed from the first composite layer, the second composite layer and the interlaminar layer;
wherein an $$\text{additive laminate ratio} = \frac{\sum_{k=1}^{m-1} \text{Area}_{Additive_k}}{\sum_{k=1}^{m} \text{Area}_{Ply_k}}$$

wherein m=a total number of plies,
wherein an Area_Ply$_k$ is the area of each composite ply (k) in the laminate,
wherein an Area Additive (k) is the area of the reinforcement present between offsetting plies (k and k+1),
wherein the additive laminate ratio of the composite material ranges between 0.05 and 0.9.

5. The composite material according to claim 4 wherein each of the first composite layer and the second composite layer has a fabric area weight ranging from 20 gsm to 500 gsm.

6. The composite material according to claim 4 wherein each the first composite layer and the second composite layer comprises at least one of a carbon fiber, fiberglass fiber, or aramid fiber.

7. The composite material according to claim 4 wherein the interlaminar layer comprises Z-Axis aligned carbon fibers and an average thickness of the Z-Axis aligned carbon fibers between the first composite layer and the second composite layer ranges from 0.003 inch to 0.060 inch.

8. The composite material according to claim 4 wherein the interlaminar layer comprises Z-Axis aligned carbon fibers and a fabric area weight of the interlaminar layer ranges from 10 gsm to 300 gsm.

* * * * *